United States Patent
Thorpe (10) Patent No.: US 7,188,842 B2
(45) Date of Patent: Mar. 13, 2007

(54) STABILIZER APPARATUS AND SYSTEM FOR RECREATIONAL VEHICLES

(76) Inventor: Jim Thorpe, 3750 La Cruz Way, Paso Robles, CA (US) 93446

( * ) Notice: Subject to any disclaimer, the term of this patent is extended or adjusted under 35 U.S.C. 154(b) by 0 days.

(21) Appl. No.: 11/253,244

(22) Filed: Oct. 18, 2005

(65) Prior Publication Data

US 2006/0081755 A1 Apr. 20, 2006

Related U.S. Application Data

(60) Provisional application No. 60/620,920, filed on Oct. 20, 2004.

(51) Int. Cl.
*B60S 9/02* (2006.01)

(52) U.S. Cl. ............... 280/6.153; 296/156; 280/763.1

(58) Field of Classification Search ............ 280/6.153, 280/6.15, 6.151, 763.1; 296/156
See application file for complete search history.

(56) References Cited

U.S. PATENT DOCUMENTS

| | | | |
|---|---|---|---|
| 2,924,463 A | | 2/1960 | Livermont |
| 3,096,065 A | * | 7/1963 | Horn ..................... 248/354.3 |
| 3,454,251 A | | 7/1969 | Dye |
| 3,475,008 A | * | 10/1969 | Taylor ..................... 254/424 |
| 3,537,724 A | | 11/1970 | Matthews |
| 3,643,907 A | * | 2/1972 | Ham ..................... 248/439 |
| 3,801,128 A | | 4/1974 | Hemdon |
| 3,933,372 A | | 1/1976 | Herndon |
| 4,014,517 A | * | 3/1977 | Keagle ..................... 254/45 |
| 4,417,426 A | * | 11/1983 | Meng ..................... 52/126.7 |
| 4,708,362 A | | 11/1987 | Raetz |
| 4,905,953 A | | 3/1990 | Wilson |
| 5,197,311 A | | 3/1993 | Clark |
| 5,520,030 A | * | 5/1996 | Muldoon ..................... 70/14 |
| 5,575,492 A | | 11/1996 | Stone |
| 6,089,603 A | | 7/2000 | Ackley |
| 6,142,488 A | | 11/2000 | Orr |
| 6,168,227 B1 | * | 1/2001 | Lofting ..................... 296/156 |
| 6,331,016 B1 | * | 12/2001 | Wallace et al. .......... 280/763.1 |
| 6,505,447 B1 | * | 1/2003 | Oliver et al. ................. 52/292 |
| 6,634,150 B1 | * | 10/2003 | Oliver et al. ................. 52/292 |
| 6,695,348 B2 | | 2/2004 | Holly |
| 2006/0017241 A1 | * | 1/2006 | Hanscom ................. 280/6.153 |

* cited by examiner

*Primary Examiner*—Paul N. Dickson
*Assistant Examiner*—Leonard McCreary, Jr.
(74) *Attorney, Agent, or Firm*—Richard A. Ryan (57) ABSTRACT

A stabilizer apparatus and system for use with recreational vehicles to reduce or eliminate side-to-side swaying and front-to-back shifting. The invention comprises one or more stabilizer components having a frame connector attached to the vehicle's frame, a jack connector attached to the leveling jack and a telescoping stabilizer bar interconnecting the frame and jack connectors. An engaging element, such as a T-bolt, locks the stabilizer bar. The frame and jack connectors utilize a universally configured connector having a base portion, a support bar mount to connect to a clevis on the stabilizer bar and a threaded end to connect to the frame or jack. The invention is configured to automatically raise and lower with the raising and lowering of the vehicle's jack system. The invention can be provided as an easily installed bolt-on kit that is adaptable to a variety of different recreational vehicles and jack systems.

20 Claims, 9 Drawing Sheets

STABILIZER APPARATUS AND SYSTEM FOR RECREATIONAL VEHICLES

CROSS-REFERENCE TO RELATED APPLICATIONS

This application claims the benefit of U.S. Provisional Application No. 60/620,920 filed Oct. 20, 2004.

BACKGROUND OF THE INVENTION

A. Field of the Invention

The field of the present invention relates generally to structural stabilizing apparatuses and systems for stabilizing recreational vehicles, trailers and the like. More specifically, this invention relates to stabilizing apparatuses and systems that are utilized in conjunction with the vehicle's jack support and leveling system to reduce or prevent swaying of the recreational vehicle when it is parked. Even more specifically, this invention relates to such recreational vehicle stabilizing apparatuses and systems that are adapted to be sold as a bolt-on kit.

B. Background

Many people utilize recreational vehicles to spend time camping, attending sporting events or traveling from one place to another. For purposes of this disclosure, recreational vehicles include those that are motorized, meaning they have a gasoline, diesel or other type of motor that drives the vehicle from one location to another, and those that must be towed behind another vehicle, such as a car or truck. Generally, when these vehicles are to be parked for any extended period of time, a set of leveling jacks are utilized to level and support the recreational vehicle. This is particularly true for non-motorized recreational vehicles, where the removal of the towing vehicle necessitates additional support to place and maintain the floor of the recreational vehicle in a substantially horizontal position. The most common types of leveling jacks, which are most commonly installed by the recreational vehicle manufacturer, are of the electric, scissor and telescoping type. Typically, such leveling jacks are used at both the front and the rear of the recreational vehicle and are adjusted to level the vehicle. The leveling jacks attach, often permanently, to the frame of the recreational vehicle to support the vehicle above the ground or other surface on which the recreational vehicle is parked.

Once the recreational vehicle is driven to the location where it will be parked, such as a campground or sporting event, the leveling jacks are engaged to take much of the weight off of the vehicle's wheels and to support the vehicle in a generally horizontal position. While parked, with the vehicle's leveling jacks set, people will commonly move around inside the recreational vehicle. Unfortunately, despite the leveling jacks and use of chock devices, those in the industry know and generally accept that the recreational vehicle will tend to sway in a side-by-side direction or shift in a front-to-back direction due to the movement inside the vehicle. Although considered at least somewhat annoying, most people either try to reduce movement, particularly rapid movement, inside the recreational vehicle or they try to just ignore this swaying and/or shifting of the recreational vehicle. For some people, however, this swaying and shifting of the recreational vehicle is very unpleasant and, as a result, substantially reduces their enjoyment of the recreational vehicle. Even those people who are able to ignore or just tolerate the swaying and shifting of the recreational vehicle would generally prefer that it did not occur.

The side-to-side swaying and/or front-to-back shifting of the recreational vehicle is generally due to play in the springs and shackles that mount the suspension to the frame and to play in the tires. While the suspension of recreational vehicles is suitable for supporting the vehicle as it is pulled by another vehicle or while it moves on its own power down the road, the suspension systems generally do not provide adequate stability to prevent swaying and shifting of the vehicle while it is parked. The factory installed electric, scissor and telescoping leveling jacks also do not stabilize the recreational vehicle from this swaying and shifting. The aftermarket industry has attempted to address the swaying and shifting problem with tripods or pin stabilizers for fifth wheel trailers and chock apparatuses for tires. However, as is well known, even these devices are manufactured with an industry-accepted tolerance of movement and play and, therefore, do not satisfactorily solve the suspension movement problem, particularly for recreational vehicles that are not of the fifth wheel type. Examples of stabilizing devices specifically configured for fifth wheel trailers are shown in U.S. Pat. No. 4,708,362 to Raetz, U.S. Pat. No. 4,905,953 to Wilson and U.S. Pat. No. 5,197,311 to Clark. Generally, these patents describe stabilizer devices that are configured to engage the fifth wheel trailer's towing/connector pin, otherwise known as a gooseneck hitch, which is attached to the underside of the overhang portion of the fifth wheel trailer. These stabilizer devices have a pair of legs, which may be telescoping legs, with a ground engaging baseplate or shoe on the bottom thereof and a lateral connector, such as a chain or wire, that interconnects the legs to draw the legs together and maintain their proper relationship when the stabilizer system is engaged.

Stabilizing apparatuses and systems for other types of trailers or that do not engage the gooseneck hitch of a fifth wheel trailer are also well known in the recreational industry. For instance, U.S. Pat. No. 5,575,492 to Stone describes a stabilizer apparatus comprising a pair of stabilizer assemblies, each having a vertical jack member and a diagonally disposed strut leg interconnected by a chain or other variable link connector, that is configured for placement under the front corners of a fifth wheel trailer. U.S. Pat. No. 6,695,348 to Holly discloses a recreational vehicle stabilizer comprising a pair of crossed stabilizer rods that interconnect the top of one coach landing leg (the leveling jack) with the bottom of the leg on the other side of the vehicle and which are joined at where they cross by a center clamp. The stabilizer rods connect to the landing legs by use of an adjusting pin. U.S. Pat. No. 3,454,251 to Dye describes a similar cross member stabilizing system. U.S. Pat. Nos. 3,801,128 and 3,933,372 to Herndon describe trailer stabilizers that have a pair of telescoping legs, each with an attachment plate at the top and a ground engaging foot member at the bottom, that are joined by an elongated rod/spring member. The attachment plate attaches to the frame or underside of the trailer. Both the attachment plate and the foot member are pivotally attached to the legs. U.S. Pat. No. 2,924,463 to Livermont describes a trailer frame support having a pair of struts that are pivotally attached to the horizontal frame members which extend outward from the trailer to the trailer hitch connection. U.S. Pat. No. 6,142,488 describes a stabilizing system for the slide-out compartment of a recreational vehicle. This system comprises a pair of telescoping legs, joined by ratchet style strap tensioner, that are pivotally attached to the slide-out track and rail structure.

While the forgoing patents describe stabilizing apparatuses and systems that generally provide some degree of stabilizing for their intended purpose, they have not heretofore effectively solved the problem of side-to-side swaying and front-to-back shifting that is a common problem and well known to those in the industry and to those who utilize recreational vehicles. What is needed, therefore, is a stabilizer apparatus and system for recreational vehicles and the like that substantially reduces or eliminates the swaying and shifting effect that occurs as a result of movement inside the recreational vehicle. The preferred stabilizer apparatus and system should be easy to install on most recreational vehicles, operate in conjunction with the vehicle's leveling jack system and be effective at stabilizing the vehicle so as to reduce or prevent swaying and shifting of the vehicle. It is also preferred that the stabilizer system be configured as a bolt-on kit which can be added to most typical leveling jack systems that are used to level and support recreational vehicles.

SUMMARY OF THE INVENTION

The stabilizer apparatus and system for recreational vehicles of the present invention provides the benefits and solves the problems identified above. That is to say, the present invention discloses a stabilizer apparatus and system for recreational vehicles that substantially reduces or prevents side-to-side swaying and front-to-back shifting of the recreational vehicle, particularly when persons move around inside the vehicle. The stabilizer apparatus and system of the present invention at least substantially eliminates the inherent chassis movement problem common to recreational vehicles, such as travel trailers and fifth wheel trailers, and eliminates the need for generally ineffective tripod or pin stabilizer systems. The stabilizer apparatus and system for recreational vehicles of the present invention can be utilized with most recreational vehicles and configured for cooperative engagement with the vehicle's leveling jack system. In very general terms, one end of the telescoping stabilizer bar connects to the recreational vehicle frame and the other end connects to the vehicle's leveling jack system to provide the stability associated with triangulation. When parked, the stabilizer bar automatically telescopes into place as the leveling jacks are lowered and the recreational vehicle leveled. A twist of the T-handle engagement device locks the stabilizer bar in place. The present recreational vehicle stabilizer apparatus and system is relatively inexpensive to manufacture, easy to install and easy to operate. In a preferred embodiment, the stabilizer apparatus and system is provided as a universal bolt-on kit that is adaptable to a variety of different types of leveling jack systems, particularly the commonly utilized electric, scissor and telescoping jack systems.

In one general aspect of the present invention, the stabilizer apparatus is used in combination with a leveling jack and the frame of a recreational vehicle to limit swaying and shifting of the recreational vehicle and comprises a frame connector attached to the frame, a jack connector attached to the leveling jack and an elongated stabilizer bar interconnecting the frame connector and the jack connector. In the preferred embodiment, the stabilizer bar comprises at least a first support bar and a second support bar that are in telescoping relationship to allow adjustment of the length of the stabilizer bar. An engaging element, such as T-bolt or other device, is used to fix the length of the stabilizer bar by preventing movement of the second support bar relative to the first support bar. Also in the preferred embodiment, each of the frame connector and the jack connector has a base portion and a support bar mount. The base portion attaches, preferably with a threaded member that receives a self-locking nut, to the frame of the recreational vehicle and to the leveling jack to form a triangular support system. The support bar mounts of both the frame connector and the jack connector are configured to be pivotally disposed in a clevis at the opposing ends of the stabilizer bar. If needed, a stiffening member is disposed between the frame connector and the frame to prevent damage to the frame and/or a spacer mount can be disposed between the frame connector and the frame when access to the frame is limited. For connection to an electrically-actuated jack, the stabilizer apparatus comprises a jack engaging member that interconnects the leveling jack and the stabilizer bar. Preferably, a second jack connector will be attached to the jack engaging member and be connected to a second stabilizer bar. The stabilizer system of the present invention is utilized in combination with a leveling jack and a frame of a recreational vehicle to limit swaying and shifting of the recreational vehicle. The stabilizer system comprises a plurality of stabilizer components, typically six of such components, each of which has the components described above. The stabilizer components of the system form a generally triangular relation with the frame and the leveling jack to prevent the undesirable swaying and shifting. In use, the length of the stabilizer bar automatically extends from a retracted position to a stabilizing position with the downward movement of the leveling jack when the engaging element is disengaged and then automatically moves from the stabilizing position to the retracted position with the upward movement of the leveling jack when the engaging element is disengaged.

Accordingly, the primary objective of the present invention is to provide a stabilizer apparatus and system for recreational vehicles that provides the advantages discussed above and overcomes the disadvantages and limitations which are associated with presently available stabilizer apparatuses and systems.

An important objective of the present invention is to provide a stabilizer apparatus and system for recreational vehicles that substantially reduces or eliminates side-to-side swaying and/or front-to-back shifting of the vehicle.

It is also an important objective of the present invention to provide a stabilizer apparatus and system for recreational vehicles that cooperates with the vehicle's leveling and support jack system to stabilize the vehicle.

It is also an important objective of the present invention to provide a stabilizer apparatus and system for recreational vehicles that is adaptable to a variety of different types of leveling jack systems, particularly electric, scissor and telescoping jack systems.

It is also an important objective of the present invention to provide a stabilizer apparatus and system for recreational vehicles that is relatively inexpensive to manufacture, easy to install and easy to operate.

It is also an important objective of the present invention to provide a stabilizer apparatus and system for recreational vehicles that is adaptable to being sold as a generally universal and versatile bolt-on kit for connection to one or more types of leveling jack systems.

The above and other objectives of the present invention will be explained in greater detail by reference to the attached figures and the description of the preferred embodiment which follows. As set forth herein, the present invention resides in the novel features of form, construction, mode of operation and combination of processes presently described and understood by the claims.

BRIEF DESCRIPTION OF THE DRAWINGS

In the drawings which illustrate the preferred embodiments and the best modes presently contemplated for carrying out the present invention.

DETAILED DESCRIPTION OF THE PREFERRED EMBODIMENTS

With reference to the figures where like elements have been given like numerical designations to facilitate the reader's understanding of the present invention, and particularly with reference to the embodiments of the stabilizer apparatus and system for recreational vehicles of the present invention illustrated in the figures, various preferred embodiments of the present invention are set forth below. The enclosed description and drawings are merely illustrative of one or more preferred embodiments and represent at least one of several different ways of configuring the present invention. Although specific components, materials, configurations and uses of the present invention are illustrated and set forth in this disclosure, it should be understood that a number of variations to the components and to the configuration of those components described herein and in the accompanying figures can be made without changing the scope and function of the invention set forth herein.

A stabilizer apparatus and system for recreational vehicles manufactured out of the materials and pursuant to the system of the present invention is shown generally as 10 in the figures. A recreational vehicle 12 utilizes a leveling jack 14, such as an electrically-actuated jack 14a shown in FIG. 1, a scissor jack 14b shown in FIG. 2 or a telescoping jack 14c shown in FIG. 3, which are all shown in the stabilizing position, to level and support the floor of recreational vehicle 12 in a generally horizontal position. The electrically-actuated jack 14a and the scissor jack 14b are shown in the retracted position in FIGS. 14 and 15. Leveling jack 14 has a ground engaging base member 16 and attaches to a rail or other component of frame 18 on the underside of recreational vehicle 12. Typically, the user adjusts the height of leveling jack 14 to obtain the desired level condition for recreational vehicle 12. As stated above, although leveling jacks 14 are suitable for leveling recreational vehicle 12 and provide adequate vertical support for recreational vehicle 12, they are generally inadequate for preventing side-to-side swaying or front-to-back shifting of recreational vehicle 12. The swaying or shifting motion is particularly a problem when there is much movement inside recreational vehicle 12 (i.e., walking, running and other such movement). As set forth in detail below, to reduce or prevent the common but undesirable swaying or shifting motion, stabilizer apparatus and system 10 of the present invention is used to provide lateral stabilizing support for recreational vehicle 12.

Figure 1:
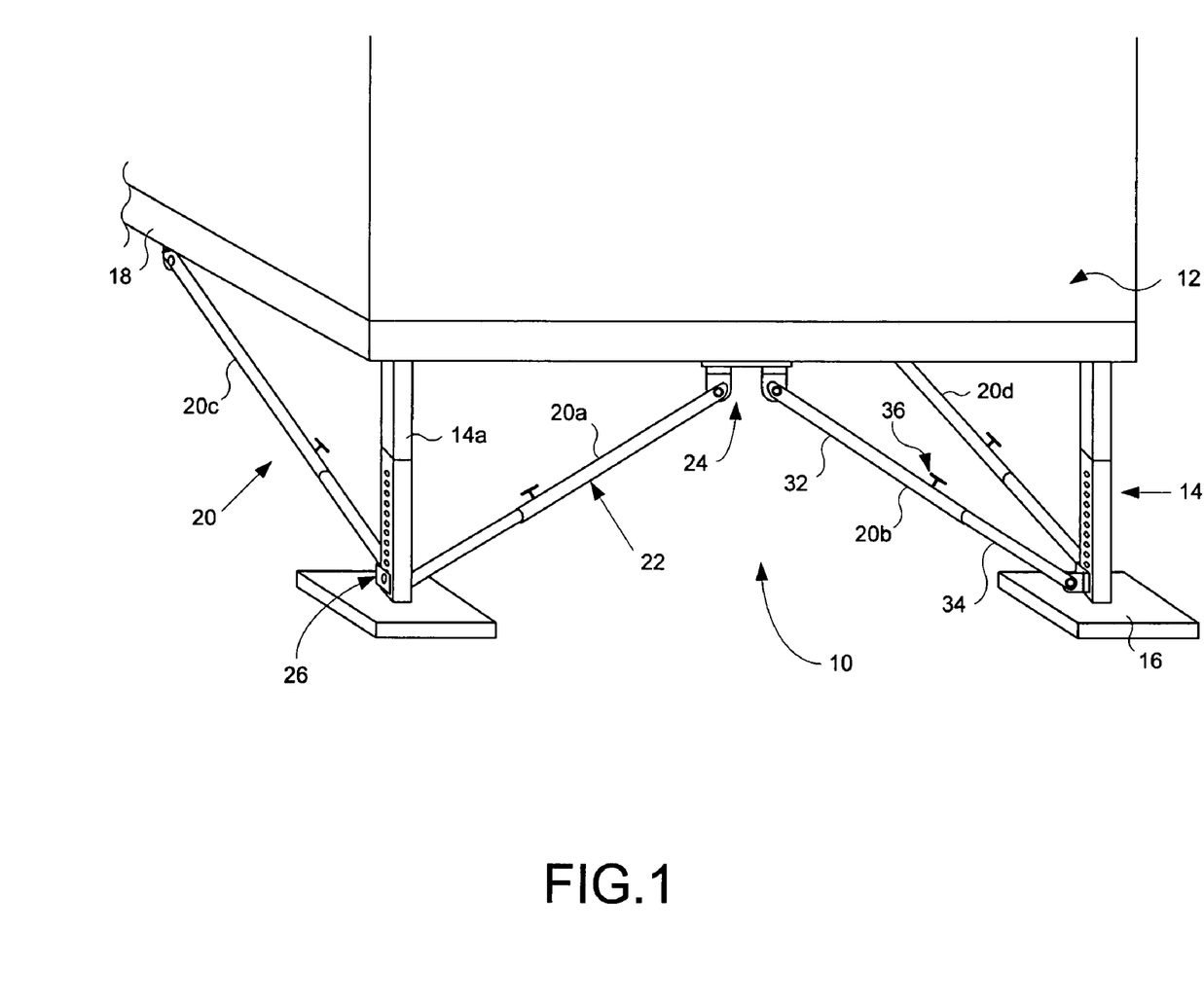
FIG. 1 is a perspective view of the front of a recreational vehicle having electrically-actuated leveling jacks and the stabilizer apparatus and system of the present invention attached thereto and shown in the stabilizing position.
Figure 2:
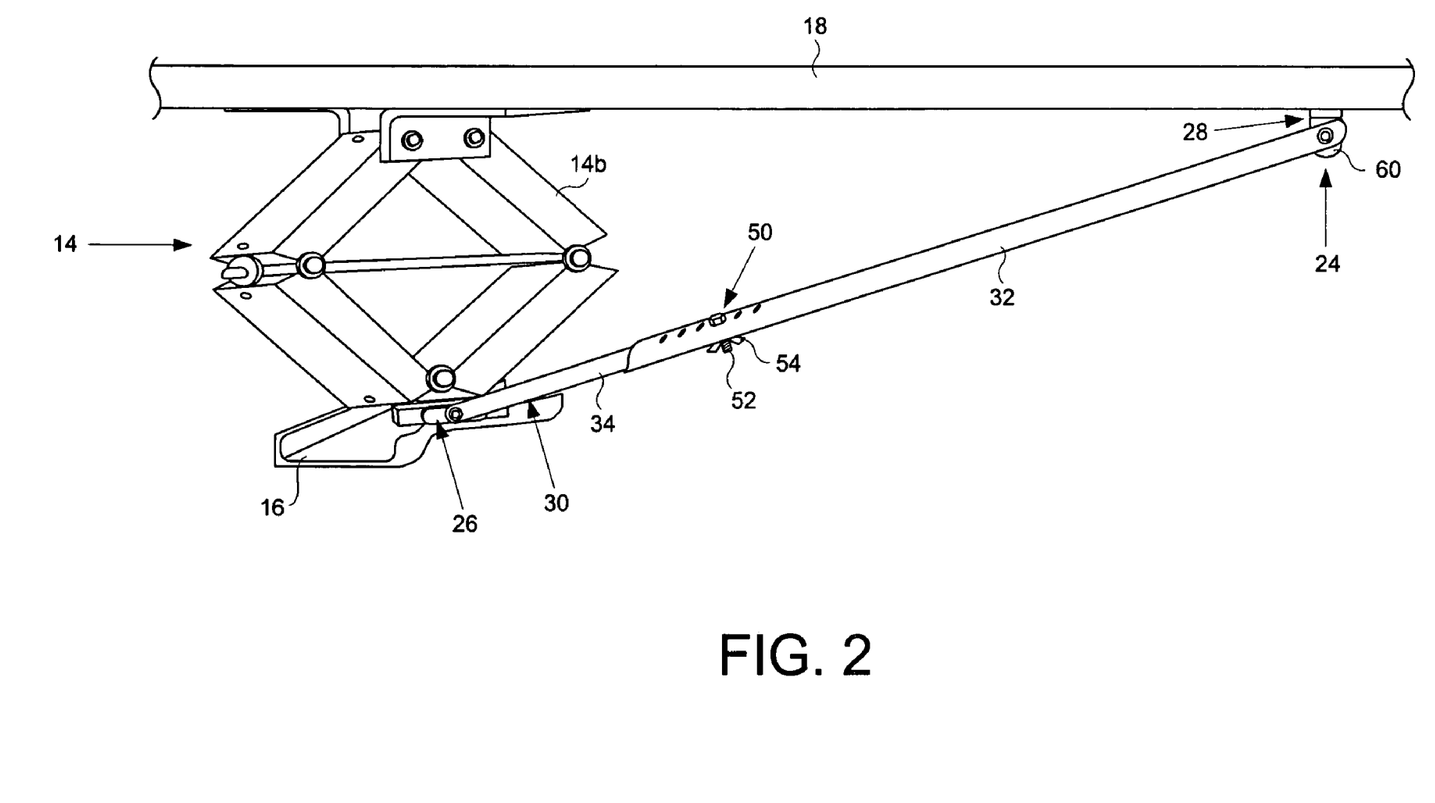
FIG. 2 is a perspective view of the side of a recreational vehicle having scissor leveling jacks and the stabilizer apparatus and system of the present invention attached thereto and shown in the stabilizing position.
Figure 3:
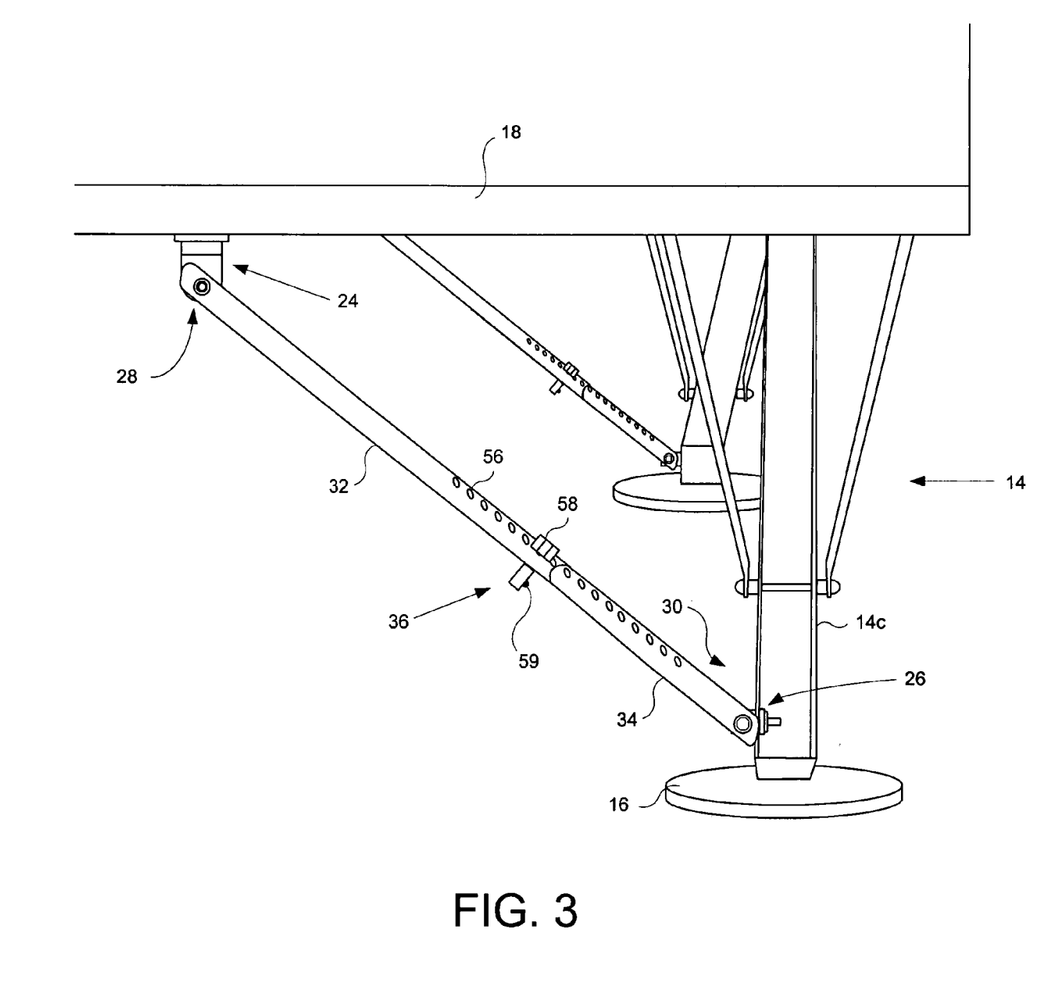
FIG. 3 is a perspective view of the side of a recreational vehicle having telescoping leveling jacks and the stabilizer apparatus and system of the present invention attached thereto and shown in the stabilizing position.
Figure 14:
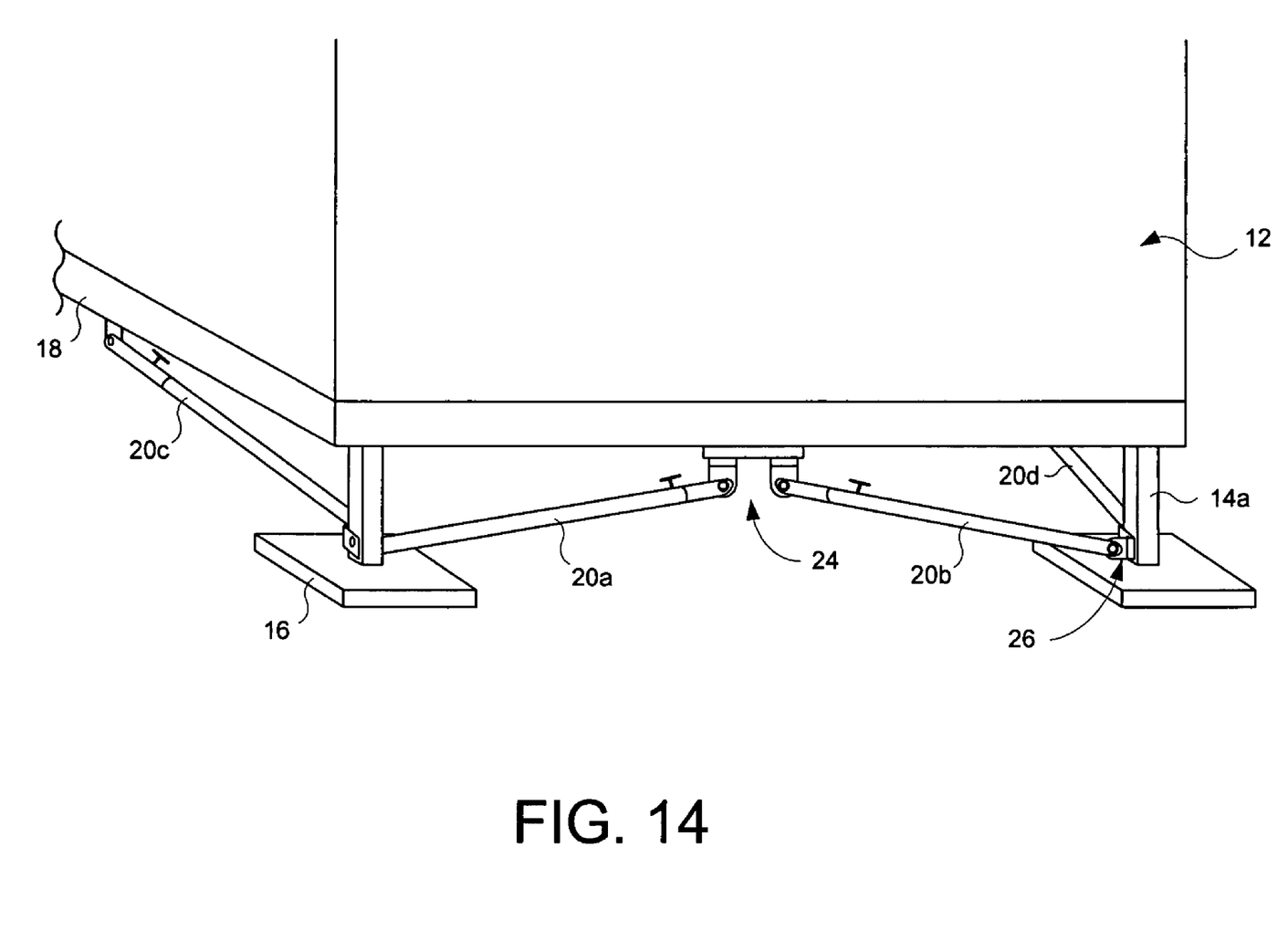
FIG. 14 is a perspective view of the front of a recreational vehicle having electrically-actuated leveling jacks and the stabilizer apparatus and system of the present invention attached thereto and shown in the retracted position.
Figure 15:
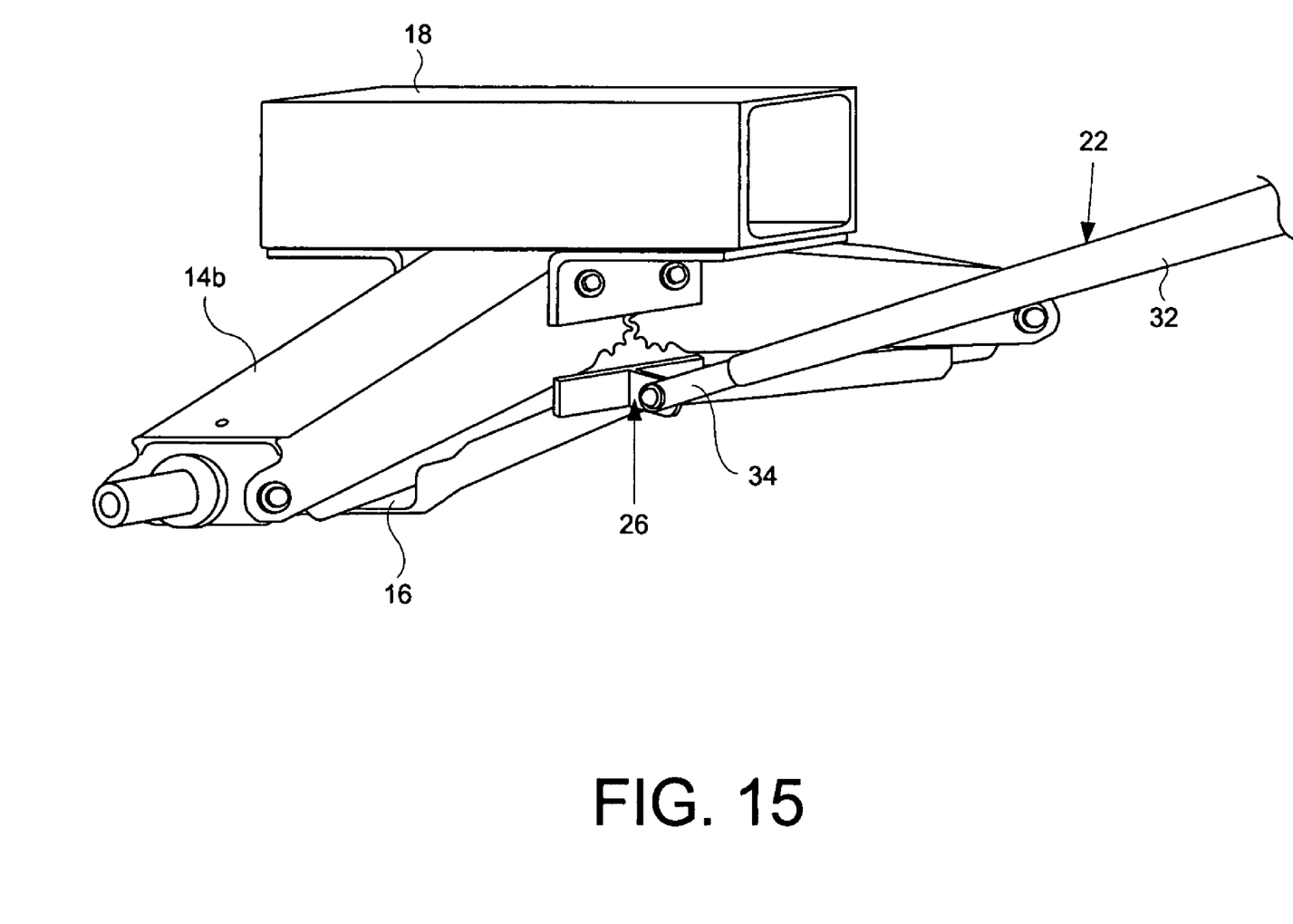
FIG. 15 is a perspective view of the scissor leveling jacks and the stabilizer apparatus and system of the present invention of FIG. 2 shown in the retracted position attached to a section of the frame.

Stabilizer system 10 comprises a plurality of stabilizer components 20 that are used to interconnect frame 18 to leveling jack 14 so as to provide triangulating stabilizing support to substantially reduce or prevent swaying and shifting of recreational vehicle 12. As best shown in FIGS. 4 through 7, stabilizer component 20 primarily comprises an elongated stabilizer bar 22, a frame connector 24 and a jack connector 26. As shown in the embodiments of FIGS. 1 through 3, frame connector 24 attaches to frame 18, jack connector 26 attaches to jack 14 and stabilizer bar 22 interconnects frame connector 24 and jack connector 26 for a generally triangular system to reduce or prevent swaying and/or shifting. The first end 28 of stabilizer bar 22 is pivotally connected to frame connector 24 and the second end 30 of stabilizer bar 22 is pivotally connected to jack connector 26. In the preferred embodiment, stabilizer bar 22 comprises an elongated first support bar 32 that telescopically engages an elongated second support bar 34. As shown in the figures second support bar 34 is telescopically engaged in first support bar 32 so the distance between frame connector 24 and jack connector 26 can be varied as necessary to obtain the desired stabilization. An engaging element 36 releasably connects first support bar 32 and second support bar 34 together so as to prevent further telescoping movement of the two members. In certain circumstances it may be possible to utilize a single support bar, instead of the two telescoping support bars 32 and 34 shown. However, as discussed in more detail below, the telescoping support bars 32 and 34 provide substantial benefits with regard to use of stabilizer apparatus and system 10 of the present invention by allowing the user to merely disengage engaging element 36 and raise leveling jacks 14 when he or she desires to move recreational vehicle 12 so as to place stabilizer apparatus 10 in the retracted position, as shown in FIGS. 14 and 15, and to allow stabilizer apparatus 10 to lower with the lowering of leveling jacks 14 when the recreational vehicle 12 is parked. Once lowered, the user then utilizes engaging element 36 to connect the telescoping first support bar 32 and second support bar 34 so as to provide the desired stabilizing for recreational vehicle 12, as shown in FIGS. 1 through 3.

As well known to those skilled in the art, at least first support bar 32 is tubular, or at least a sufficient portion of first support bar 32, to slidably receive second support bar 34 therein. In the preferred embodiment, both first support bar 32 and second support bar 34 are tubular. Although the first 32 and second 34 support bars are shown in the drawings as having a round cross-section, those skilled in the art will readily recognize that support bars 32 and 34 can be configured with a variety of different cross-sections, such as square, rectangular or oval and still accomplish the objectives of the present invention. First 32 and second 34 support bars must be made out of materials which are sufficiently rigid and strong to withstand the swaying and shifting forces that they are intended to prevent. In addition, because the stabilizer apparatus and system 10 of the present invention is intended to be utilized in outdoor environment and subject to a variety of different weather conditions, the material selected for support bars 32 and 34, as well as the other components of apparatus 10, should be sufficiently corrosion, heat, cold and ultraviolet light resistant to provide a suitably long and useful life. In one preferred embodiment, support bars 32 and 34 are made out of powder coated steel. As known to those skilled in the art, a variety of other materials (including metals, composites and certain plastics) can also be effectively utilized for first support member 32 and second support member 34.

Figure 5:
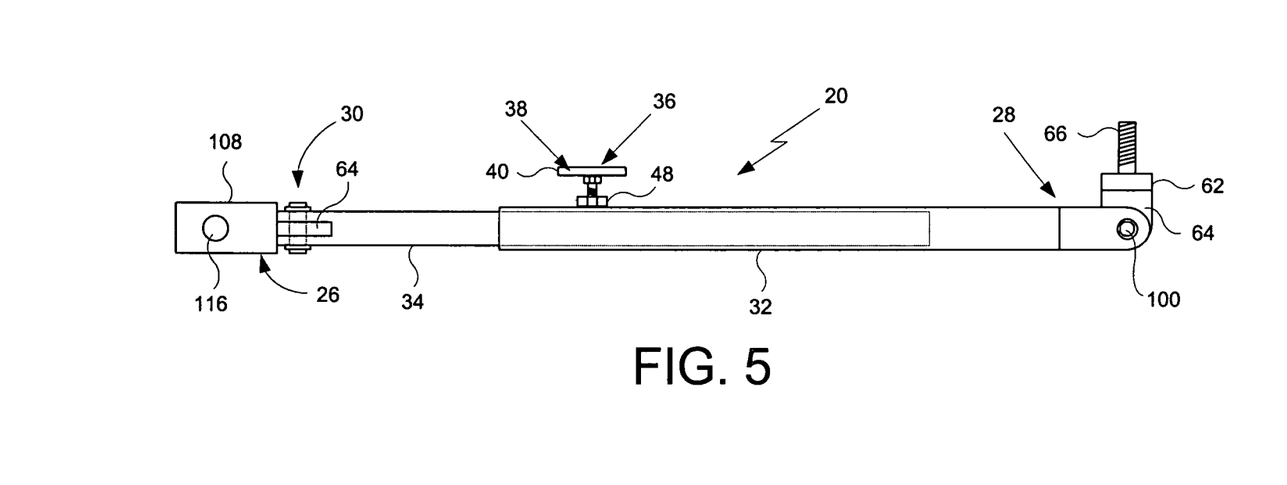
FIG. 5 is a side view of the stabilizer component of FIG. 4.
Figure 6:
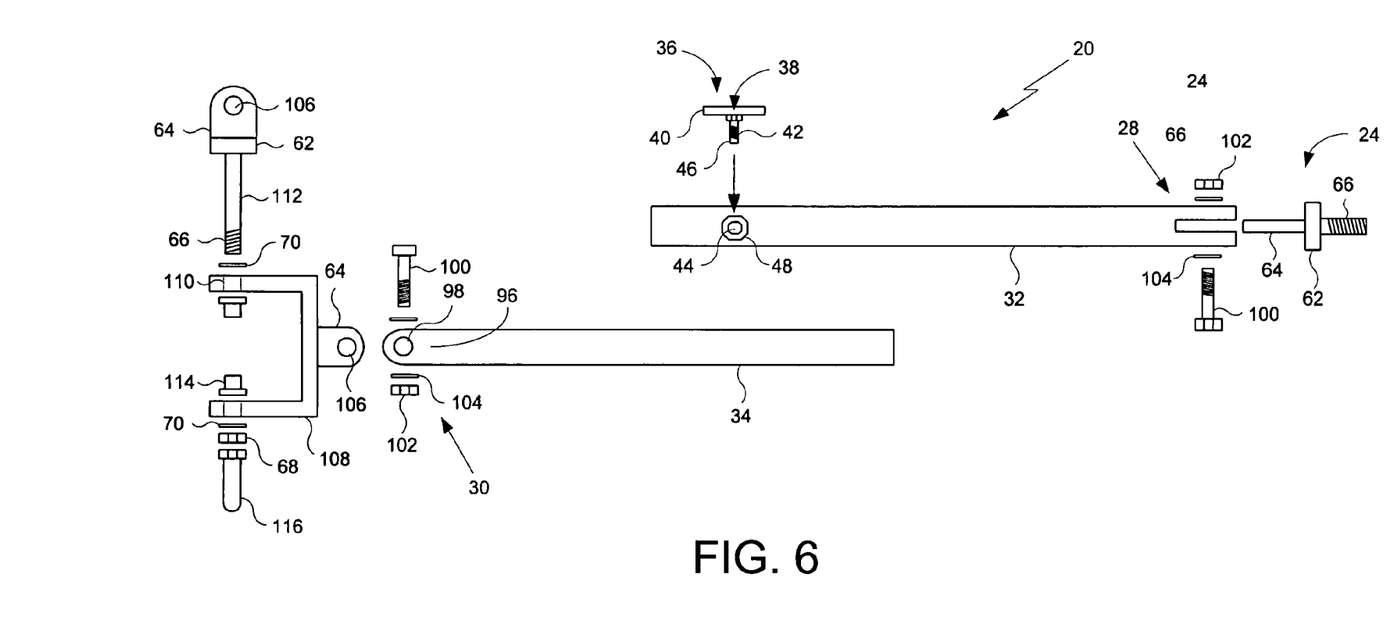
FIG. 6 is an exploded top view of the stabilizer component of FIG. 4.
Figure 7:
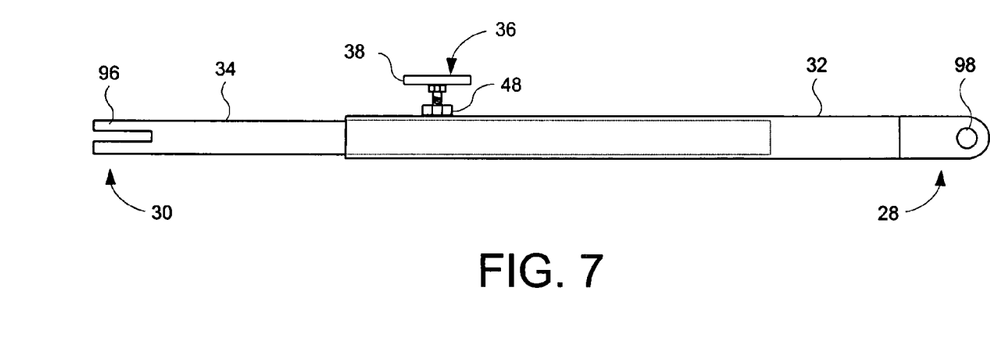
FIG. 7 is a top view of the stabilizer bar component of the stabilizer apparatus and system of the present invention.

In the preferred embodiment, engaging element 36 is a T-bolt 38, shown in FIGS. 1 and 5 through 7, having a handle portion 40 and a threaded portion 42 that is received in the like threaded aperture 44 formed by engaging nut 46 affixed to first support bar 32. As will be readily understood by those skilled in the art, when second support bar 34 is telescopically received in first support bar 34 and the threaded portion 42 received in threaded aperture 44, the user turns handle portion 40 to cause the engaging end 46 of T-bolt 38 to abuttingly contact the surface of second support bar 34. Further turning of handle portion 40 will fix the position of second support bar 34 relative to first support bar 32 and, therefore, the length of stabilizer bar 20. Engaging end 46 can be flat, as shown in FIG. 7, or it can be pointed or otherwise shaped to better engage the outer surface of second support bar 34 and fix its position relative to first support bar 32. If desired, T-bolt 38 can also comprise a nut portion 48 that is configured to allow the user to utilize a wrench or like tool to tighten the engagement of engaging end 46 against second support bar 34. The T-bolt configuration described above is preferred due to the ease of engaging and disengaging the telescopically configured first support bar 32 and second support bar 34. In one alternative embodiment, shown in FIG. 2, engaging element 36 comprises a bolt/nut connector 50 having a threaded bolt 52 configured to be received in a threaded nut 54, which is shown as a wing nut due to the relative ease of engaging with bolt 52. In this embodiment, both first support bar 32 and second support bar 34 comprise one or more cooperatively configured through apertures 56 that are configured to receive bolt 52 therethrough. In the preferred configuration of this embodiment, at least one of the first support bar 32 and second support bar 34 comprise a plurality of such apertures to allow for adjustment of the length of stabilizer bar 22 when first 32 and second 34 support bars are joined together. In yet another alternative embodiment, shown in FIG. 3, engaging element 36 is a locking pin 58 having a spring loaded ball 59 or other device configured to lockingly engage locking pin 56 in cooperatively configured apertures 56. As well known in the art, other types of connectors and/or clamping mechanisms, other than the T-bolt 38, bolt/nut connector 50 and locking pin 58 shown in FIGS. 1, 2 and 3, respectively, can be utilized to fix the position of first support bar 32 relative to second support bar 34 and engage the stabilizing effect of the present invention.

Figure 8:
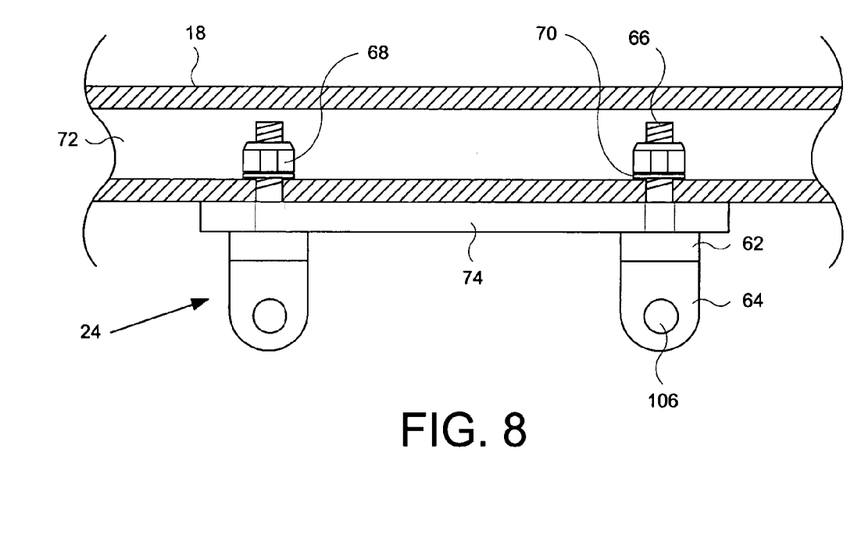
FIG. 8 is a cross-sectional side view of the embodiment of the frame connector of the present invention of FIG. 1 shown attached to the frame.
Figure 9:
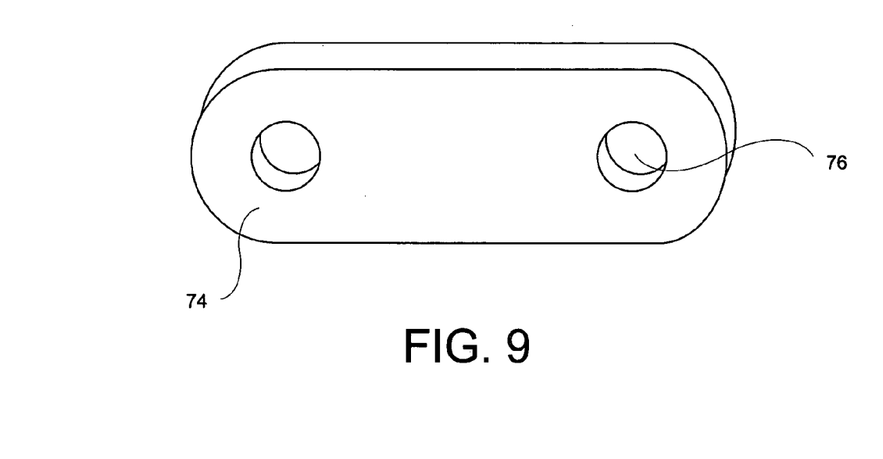
FIG. 9 is a perspective view of the stiffening member shown in use with the frame connector of FIGS. 1 and 8.
Figure 10:
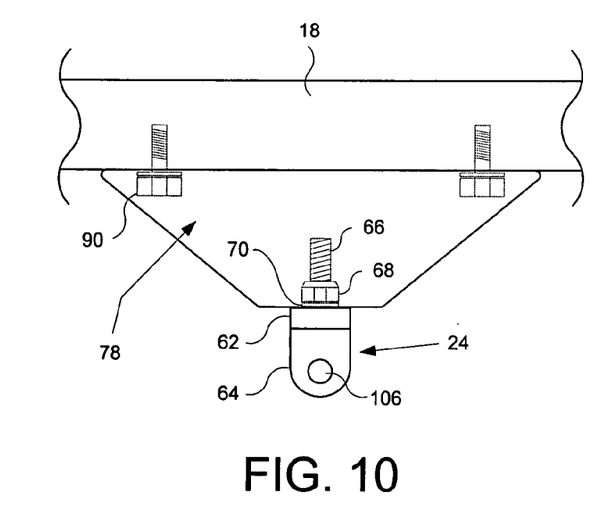
FIG. 10 is a side view of the a frame connector of the present invention shown in use with a spacer mount attached to the frame of the recreational vehicle.
Figure 11:
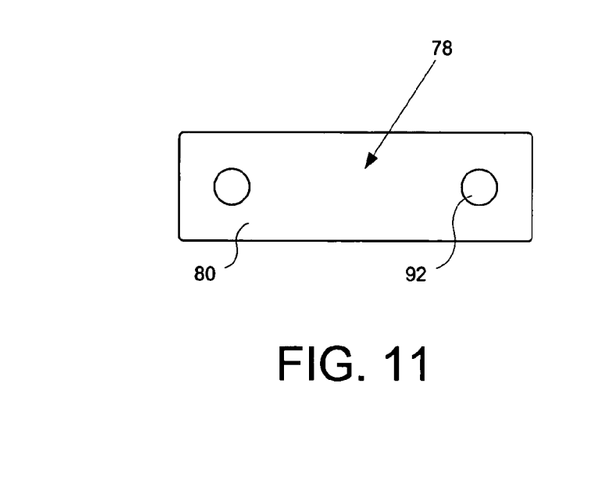
FIG. 11 is a top view of the top surface of the spacer mount of FIG. 10.
Figure 12:
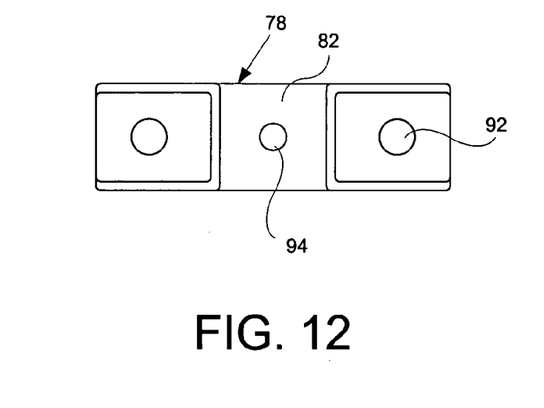
FIG. 12 is a bottom view of the bottom surface of the spacer mount of FIG. 10.
Figure 13:
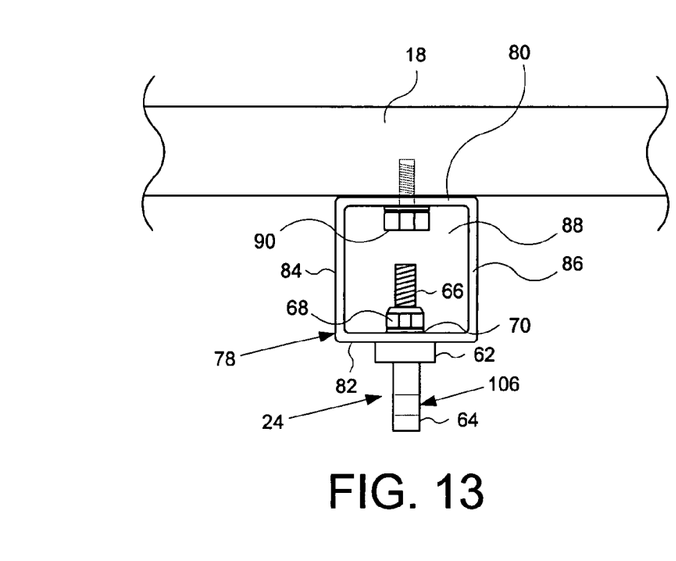
FIG. 13 is a side view of the frame connector and spacer mount shown in FIG. 10.

As best shown in FIGS. 4–6, 8, 10 and 13, the preferred embodiment frame connector 24 comprises stabilizer connector 60 having base portion 62, an outwardly extending support bar mount 64 and threaded portion 66 which are cooperatively configured to engage frame 18 and pivotally connect to first end 28 of stabilizer bar 22. In the preferred embodiment, threaded portion 66 of stabilizer connector 60 is received in an aperture (not shown) in frame 18 and connected to a threaded connector, such as self-locking nut 68, with a washer 70 disposed therebetween, as best shown in FIGS. 8, 10 and 13. For many recreational vehicles 12, frame 18 will comprise a tubular section, as best illustrated in the isolated view of FIG. 8, having an interior channel 72 in which nut 68 and washer 70 can be located to engage the end of threaded portion 66 to clamp base portion 62 tightly against frame 18. A number of other recreational vehicles 12 have an L or C-shaped frame member which can be provided with an aperture to receive threaded portion 66 of frame connector 24. To prevent buckling of the tubular frame section forming channel 72, a stiffening member 74 (shown in isolation in FIG. 9) is disposed between base portion 62 of stabilizer connector 60 and frame 18. Stiffening member 74 has one or more appropriate apertures 76 that are configured to allow threaded portion 66 of stabilizer connector 60 to pass therethrough for engagement by nut 68. Stiffening member 74 should be configured in thickness, width and length to provide sufficient stiffening to protect frame 18 from damage by base portion 62 due to tightening of nut 68 on threaded portion 66. In one configuration, stiffening member 74 is made out of stainless steel one-fourth inch thick, one and one-fourth inch wide and two and one-half inches long. In certain circumstances access to frame 18 may be limited or even entirely inhibited, for instance due to the presence of a gas line or insulation, or the rectangular tube is configured such that it is not possible or convenient to place nut 68 in a position to engage threaded portion 66. In these circumstances, use of a spacer mount 78 facilitates the installation of frame connector 24 to frame 18, as shown in FIGS. 10 and 13. In the embodiment shown in FIGS. 10 through 13, spacer mount 78 is a tubular member shaped and configured to cooperatively engage frame 18 and support stabilizer connector 60. Spacer mount 78 has frame engaging top surface 80 and a spaced apart connector engaging bottom surface 82 and a first side 84 and a spaced apart second side 86 forming channel 88. As shown, top surface 80 is placed in abutting relation with the bottom of frame 18. One or more appropriately configured connecting elements 90, such as the self-tapping screws shown in FIGS. 10 and 13, inserted through top apertures 92, shown in FIGS. 11 and 12, and into frame 18. Bottom surface 82 has one or more bottom apertures 94 configured to receive threaded portion 66 of stabilizer connector 24. Nut 68 is attached to threaded portion 66 and utilized to place base portion 62 in abutting relation with bottom surface 82. As described in more detail below, first end 28 of stabilizer bar 22 connects to support bar mount 64 projecting outwardly from spacer mount 78.

Figure 4:
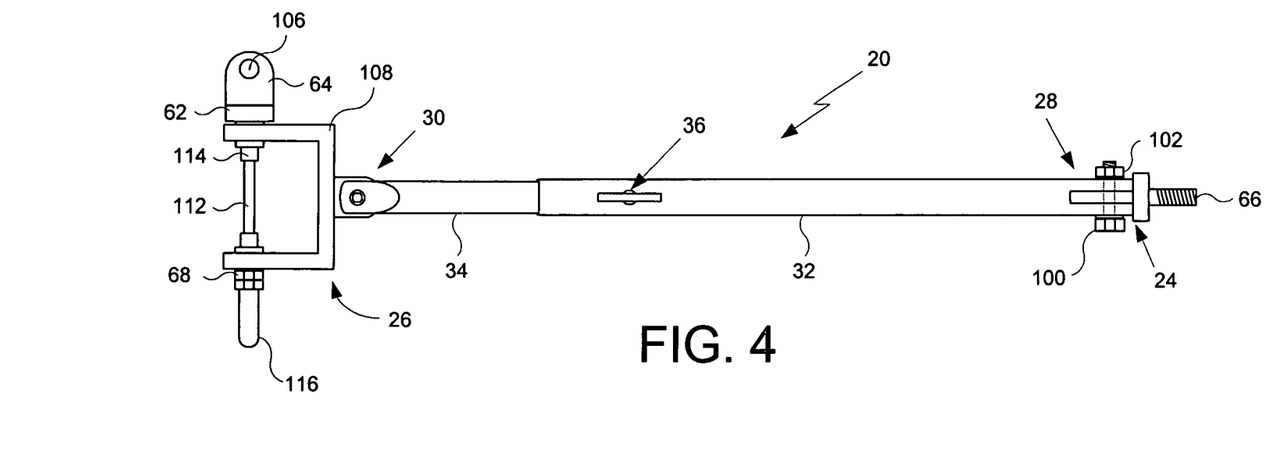
FIG. 4 is a top view of the stabilizer component showing the stabilizer bar and mounting brackets of the stabilizer apparatus of FIG. 1.

As stated above, stabilizer bar 22, shown in isolation in FIG. 7, is utilized to interconnect frame connector 24 at frame 18 and jack connector 26 at leveling jack 14 to provide stabilizing support for vehicle 12 to substantially reduce or prevent swaying and shifting of vehicle 12. As also set forth above, in the preferred embodiment of the present invention stabilizer bar 22 comprises a first support bar 32 that is telescopically engaged with second support bar 34 such that, in the embodiment shown, a portion of second support bar 34 is slidably received inside of first support bar 32. Engaging element 36, such as the T-bolt shown, is utilized to clamp or otherwise prevent movement of first 32 and second 34 support bars relative to each other. In the preferred embodiment of the stabilizer apparatus and system 10 of the present invention, both first end 28 and second end 30 of stabilizer bar 22 are configured the same and adapted to engage like configured frame connector 24 and jack connector 26. In a preferred embodiment, both first end 28 and second end 30 of stabilizer bar 22 comprise a clevis 96, having an aperture 98 therethrough, sized and configured to connect to stabilizer connector 60 (whether used for frame connector 24 or jack connector 26), as best shown in FIGS. 4 and 5, by use of a connecting element, such as the bolt 100, nut 102 and washers 104 shown in FIG. 6. Bolt 100 is sized to fit through aperture 98 of clevis 96 and aperture 106 in support bar mount 64. As those skilled in the art will be familiar with, the opening of clevis 96 is sized and configured to receive the support bar mount 64 portion of stabilizer connector 60 therein, with apertures 98 of clevis 96 and aperture 106 of support bar mount 64 be substantially aligned, such that frame connector 24 is allowed to pivot relative to first end 28 of stabilizer bar 22 (i.e., swing bolt configuration). As set forth in more detail below, the connection between second end 30 of stabilizer bar 22 and jack connector 26 is similarly configured such that similar or very similar components can be utilized at both connectors. Use of the same types of connectors (i.e., stabilizer connector 60) facilitates use of the stabilizer apparatus and system of the present invention as a bolt-on kit that can be used with different types of recreational vehicles 12 and leveling jacks 14.

Second end 30 of stabilizer bar 22 connects to jack connector 26, which is attached to leveling jack 14, as shown in FIGS. 1 through 3. Jack connector 26 shown in FIGS. 1 and 4 through 5 is configured for use at the front of a recreational vehicle 12 having electrically-actuated jacks 14a so as to connect to the stabilizer components 20 that are installed to prevent side-to-side swaying (shown as 20a and 20b) and the stabilizer components 20 that are installed to prevent front-to-back shifting (shown as 20c and 20d). The stabilizer component 20 shown in FIGS. 4 through 6 is configured for use as stabilizer components 20c and 20d of FIG. 1. In this configuration, jack connector 26 comprises a generally U-shaped jack engaging member 108 sized and configured to extend around the leg of leveling jack 14a. Attached to jack engaging member 108 is a support bar mount 64 (the same component as for stabilizer connector 60 described above for frame connector 24, but with the engaging member as the base portion 62 and no threaded portion 66) having an aperture 106 for cooperative connection with the aperture 98 in clevis 96 at second end 30 of stabilizer bar 22 using bolt 100, nut 102 and washer 104, in the manner as described above for frame connector 24. Use of clevis 96 and support bar mount 64 allows jack engaging member 108 to pivot relative to stabilizer bar 22. As known to those skilled in the art, the lower leg of leveling jack 14a comprises a plurality of openings used for locking the lower leg in a lowered or raised position relative to the upper leg of the leveling jack 14a. Jack engaging member 108 is sized and configured to straddle the lower leg and is provided with an aperture 110 that is placed in cooperative alignment with holes in lower leg near base member 16. In one embodiment, a sufficiently long bolt is placed through aperture 110 in jack engaging member 108 and the holes in the lower leg of leveling jack 14a and is then connected to nut 68 on the opposite side thereof. In the preferred embodiment, a stabilizer connector 60 configured as described above for frame connector 24 is utilized, with the addition of shaft portion 112 disposed between base 62 and threaded portion 66 to extend the length thereof and to cooperatively engage a pair of bushings 114 inside the U-shaped portion of jack engaging member 108. The addition of stabilizer connector 60, providing a second support bar mount 64, on jack engaging member 108 allows the joining of two stabilizer components 20 at the same leveling jack 14, such as the electrically-actuated jack 14a, as shown in FIG. 1 with stabilizer components 20c/20a and 20d/20b. This configuration provides a relatively simple mechanism to resist both swaying and shifting forces. The addition of the smooth shaft portion 112 and bushings 114 allows jack engaging member 108 to pivot relative to leveling jack 14, thereby allowing the user to better adjust the angle of stabilizer bar 22 when installed on recreational vehicle 12. Also in the preferred embodiment, a lifting handle 116 is attached to the end of threaded portion 66 that extends past nut 68. Lifting handle 116 is provided to make easier for the user to raise and lower leveling jack 14 with the stabilizer apparatus 10 of the present invention attached thereto. Use of lifting handle 116 will facilitate the user grabbing the bottom of leveling jack 14 instead of having to reach down and pull upward on base member 16 to raise the lower leg of leveling jack 14.

For the scissor jack 14b shown in FIG. 2 and the telescoping jack 14c shown in FIG. 3, jack connector 26 comprises generally the same stabilizer connector 60 utilized for the frame connector 24 described above, namely a stabilizer connector 60 having a base portion 62, support bar mount 64 and a threaded portion 66 that is engaged by a self-locking nut 68 having a washer 70. For the scissor jack 14b, the bottom center bolt of the jack 14b is removed and replaced with a stabilizer connector 60 having a sufficiently long threaded portion 66 to extend through the scissor jack 14b near base member 16 and then secured in place with nut 68. For the telescoping jack 14c, the threaded portion 66 of stabilizer connector 60 is inserted in one of the lower holes (i.e., near base member 16) and secured in place by nut 68. As with the above, the clevis 96 of second end 30 of stabilizer bar 22 is cooperatively engaged, using bolt 100, nut 102 and washers 104, with the support bar mount 64 of jack connector 26 such that stabilizer bar 22 is allowed to pivot relative to leveling jack 14.

The apparatus and system 10 of the present invention can be provided to the user as a bolt-on kit for installation in recreational vehicle 12. In the preferred embodiment of the kit, the user would be provided with six stabilizer components 20, comprising six stabilizer bars 22, six frame connectors 24 and six jack connectors 26. Four of the stabilizer components 20 are placed at the front of the recreational vehicle 12, with two at the front end and two along the side at the front end, as shown in FIG. 1 with regard to stabilizer components 20a, 20b, 20c and 20d. Two of the stabilizer components 20 are placed along the side near the back end of the recreational vehicle 12. The six frame connectors 24 comprise six stabilizer components 60 and their associated connecting hardware (i.e., nut 68 and washer 70). The six jack connectors 26 comprise two of the generally U-shaped jack engaging members 108 and four stabilizer components 60, two of which have shaft portion 112 for connection to the jack engaging members 108 and two have threaded portions 66 suitable for mounting to scissor jack 14b and/or telescoping jack 14c. In the preferred embodiment, the kit comprises at least one stiffening member 74 having a pair of apertures 76 for the center front frame connector 24 and at least one spacer mount 82 for a difficult to reach location for connection to frame 18. In one preferred embodiment, first support bar 32, second support bar 34 and jack engaging member 108 are made out of steel, preferably powder coated, and the various components that make up frame connector 24, jack connector 26 (except jack engaging member 108 and bushings 114, which are brass) and engaging element 36 are made out of stainless steel. As well known in the art, various other materials can be used for the components that make up apparatus 10, including various other metals and certain composites and plastics.

In use, a pair of stabilizer components 20 are utilized in the front end of recreational vehicle 12 and one stabilizer component 20 on each side of the front end of recreational vehicle 12, as shown in FIG. 1. This configuration provides a triangulation that will stabilize recreational vehicle 12 against swaying or shifting movement. Along the sides of recreational vehicle 12 towards the back end, as exemplified in FIG. 2, one stabilizer component 20 is used on each side of recreational vehicle 12. If desired for additional swaying or shifting resistance, a third stabilizer component 20 can be utilized at the back end of recreational vehicle 12 to interconnect the jack support 14 on one side of the recreational vehicle 12 with the frame 18 on the opposite side. In the preferred embodiment, as described above, frame connectors 24 are bolted to frame 18 and/or leveling jack 14. As known to those skilled in the art, however, stabilizer connector 60 of frame connector 24 can alternatively attach to frame 18 with screws, welds, adhesives, or other types of attachment mechanisms that are suitable for frame 18 and stabilizer connector 60. Jack connectors 26 are attached to jack supports 14. With second support bar 34 telescopically received inside first support bar 32, the user can adjust the length of stabilizer bar 22 between frame connectors 24 and jack connectors 26 as needed. When the recreational vehicle 12 is parked and leveling jack 14 is extended such that base member 16 contacts the ground, stabilizer bar 22 will automatically extend with the downward movement of leveling jack 14. Once the leveling jacks 14 are set and stabilizer bars 22 extended, the user then joins first support bar 32 and second support bar 34 together using engaging element 36 to lock them in place, as shown in FIGS. 1 through 3. Once locked in place, the recreational vehicle 12 will be stabilized against side-to-side swaying and front-to-back shifting, thereby providing a more enjoyable use of recreational vehicle 12. When the recreational vehicle 12 is to be moved, engaging element 36 is disengaged to allow first support bar 32 and second support bar 34 to freely telescopically move relative to each other. When the leveling jack 14 is raised, second support bar 34 will slide inside first support bar 32, thereby collapsing stabilizer bar 22 and placing stabilizer apparatus 22 in the retracted position, as shown in FIGS. 14 and 15, and out of the way for movement of recreational vehicle 12. When the recreational vehicle 12 is parked again, the jack supports 14 are re-lowered, causing first support bar 32 and second support bar 34 to once again telescopically extend. When joined or otherwise clamped together with engaging element 36, the recreational vehicle 12 will be stabilized against swaying and shifting movement.

While there are shown and described herein certain specific alternative forms of the invention, it will be readily apparent to those skilled in the art that the invention is not so limited, but is susceptible to various modifications and rearrangements in design and materials without departing from the spirit and scope of the invention. In particular, it should be noted that the present invention is subject to modification with regard to the dimensional relationships set forth herein and modifications in assembly, materials, size, shape, and use. For instance, there are numerous components described herein that can be replaced with equivalent functioning components to accomplish the objectives of the present invention. One such modification is the use of different materials than those set forth herein. Another modification would be a change in the dimensional characteristics of the various components.

What is claimed is:

1. A stabilizer apparatus in combination with a leveling jack and a frame of a recreational vehicle to limit swaying and shifting of said recreational vehicle, said stabilizer apparatus comprising:
   a frame connector attached to said frame, said frame connector having a stabilizer connector with a base portion and support bar mount;
   a jack connector attached to said leveling jack, said jack connector having at least one stabilizer connector having a base portion and support bar mount; and
   an elongated stabilizer bar interconnecting said frame connector and said jack connector, said stabilizer bar having a first end pivotally connected to said frame connector and a second end pivotally connected to said jack connector, said jack connector having a jack engaging member interconnecting said leveling jack and said stabilizer bar, said jack engaging member pivotally attached to said leveling jack.

2. The stabilizer apparatus according to claim 1, wherein said frame connector further comprises a threaded portion configured to be received by said frame so as to place said base portion in substantially abutting relationship therewith.

3. The stabilizer apparatus according to claim 1, further comprising a spacer mount disposed between said frame connector and said frame, said spacer mount attached to said frame and configured to place said base portion in a spaced apart relation to said frame.

4. The stabilizer apparatus according to claim 3, wherein said spacer mount has a tubular cross-section.

5. The stabilizer apparatus according to claim 1, wherein said jack connector further comprises a threaded portion configured to be received by said leveling jack so as to place said base portion in substantially abutting relationship therewith.

6. The stabilizer apparatus according to claim 1 further comprising a second jack connector attached to said jack engaging member, said second jack connector attached to a second stabilizer bar, said second jack connector having a shaft portion disposed in a pair of bushings, said pair of bushings pivotally connecting said jack engaging member to said leveling jack.

7. The stabilizer apparatus according to claim 1, wherein said stabilizer bar comprises a first support bar telescopically engaged with a second support bar and an engaging element configured to selectively prevent telescoping movement of said first support bar and said second support bar and fix the length of said stabilizer bar.

8. The stabilizer apparatus according to claim 7, wherein said engaging element has an engaging end configured to selectively abut said second support bar.

9. The stabilizer apparatus according to claim 1, wherein said stabilizer bar comprises a clevis on at least one of said first end and said second end of said stabilizer bar, said support bar mount of said frame connector and/or said jack connector pivotally disposed in said clevis.

10. A stabilizer apparatus in combination with a leveling jack and a frame of a recreational vehicle to limit swaying and shifting of said recreational vehicle, said stabilizer apparatus comprising:
a frame connector attached to said frame, said frame connector having a stabilizer connector with a base portion and support bar mount;
a jack connector attached to said leveling jack, said jack connector having at least one stabilizer connector having a base portion and support bar mount;
an elongated stabilizer bar interconnecting said frame connector and said jack connector, said stabilizer bar having a first end pivotally connected to said frame connector and a second end pivotally connected to said jack connector; and
a spacer mount disposed between said frame connector and said frame, said spacer mount attached to said frame and configured to place said base portion in a spaced apart relation to said frame.

11. The stabilizer apparatus according to claim 10, wherein said stabilizer bar comprises a first support bar telescopically engaged with a second support bar and an engaging element configured to selectively prevent telescoping movement of said first support bar and said second support bar and fix the length of said stabilizer bar.

12. The stabilizer apparatus according to claim 11, wherein said jack connector further comprises a jack engaging member interconnecting said leveling jack and said stabilizer bar, said jack engaging member pivotally attached to said leveling jack.

13. The stabilizer apparatus according to claim 12, further comprising a second jack connector attached to said jack engaging member, said second jack connector attached to a second stabilizer bar, said second jack connector having a shaft portion disposed in a pair of bushings, said pair of bushings pivotally connecting said jack engaging member to said leveling jack.

14. The stabilizer apparatus according to claim 10, wherein said stabilizer bar comprises a clevis on at least one of said first end and said second end of said stabilizer bar, said support bar mount of said frame connector and/or said jack connector pivotally disposed in said clevis.

15. The stabilizer apparatus according to claim 10, wherein said spacer mount has a tubular cross-section.

16. The stabilizer apparatus according to claim 15, wherein said frame connector further comprises a threaded portion configured to be received by said spacer mount so as to place said base portion in substantially abutting relationship therewith and said jack connector further comprises a threaded portion configured to be received by said leveling jack.

17. A stabilizer system in combination with a leveling jack and a frame of a recreational vehicle to limit swaying and shifting of said recreational vehicle, said stabilizer system comprising a plurality of stabilizer components, each of said stabilizer components having a frame connector attached to said frame, a jack connector attached to said leveling jack, an elongated stabilizer bar interconnecting said frame connector and said jack connector, an engaging element attached to said stabilizer bar and a spacer mount disposed between said frame connector and said frame, said spacer mount attached to said frame and configured to place said base portion in a spaced apart relation to said frame, each of said frame connector and said jack connector having a stabilizer connector with a base portion and support bar mount, said stabilizer bar having a first end pivotally connected to said frame connector and a second end pivotally connected to said jack connector, said jack connector further comprising a jack engaging member interconnecting said leveling jack and said stabilizer bar, said jack engaging member pivotally attached to said leveling jack, said stabilizer bar comprising a first support bar telescopically engaged with a second support bar, said engaging element configured to selectively prevent telescoping movement of said first support bar and said second support bar and fix the length of said stabilizer bar,
whereby each of said stabilizer components forms a generally triangular relation with said frame and said leveling jack and the length of said stabilizer bar automatically extends from a retracted position to a stabilizing position with the downward movement of said leveling jack when said engaging element is disengaged and then automatically moves from said stabilizing position to said retracted position with the upward movement of said leveling jack when said engaging element is disengaged.

18. The stabilizer apparatus according to claim 17, wherein said spacer mount has a tubular cross-section.

19. The stabilizer apparatus according to claim 18, wherein said frame connector further comprises a threaded portion configured to be received by said spacer mount so as to place said base portion in substantially abutting relationship therewith and said jack connector further comprises a threaded portion configured to be received by said leveling jack.

20. The stabilizer apparatus according to claim 17, further comprising a second jack connector attached to said jack engaging member, said second jack connector attached to a second stabilizer bar, said second jack connector having a shaft portion disposed in a pair of bushings, said pair of bushings pivotally connecting said jack engaging member to said leveling jack.

* * * * *